United States Patent
Watt

(10) Patent No.: US 9,361,325 B2
(45) Date of Patent: *Jun. 7, 2016

(54) GOVERNING INFORMATION

(71) Applicant: International Business Machines Corporation, Armonk, NY (US)

(72) Inventor: Dougal A. Watt, Auckland (NZ)

(73) Assignee: International Business Machines Corporation, Armonk, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/489,795

(22) Filed: Sep. 18, 2014

(65) Prior Publication Data

US 2015/0006494 A1 Jan. 1, 2015

Related U.S. Application Data

(63) Continuation of application No. 13/428,011, filed on Mar. 23, 2012, now Pat. No. 8,874,507.

(51) Int. Cl.
G06F 17/30 (2006.01)
G06Q 10/06 (2012.01)

(52) U.S. Cl.
CPC .......... *G06F 17/30294* (2013.01); *G06Q 10/06* (2013.01)

(58) Field of Classification Search
CPC ............. G06F 17/30294; G06Q 10/06; G06Q 10/0633; G06Q 10/087; G06Q 10/10
USPC .......... 707/610, 737, 769; 705/7, 12; 715/763
See application file for complete search history.

(56) References Cited

U.S. PATENT DOCUMENTS

| 6,789,252 | B1 | 9/2004 | Burke et al. |
| 7,885,793 | B2 | 2/2011 | Padmanabhan |
| 8,874,507 | B2 | 10/2014 | Watt |
| 2006/0059253 | A1* | 3/2006 | Goodman ............ G06Q 10/10 709/223 |
| 2009/0112655 | A1* | 4/2009 | Stuhec ............... G06Q 10/0633 705/7.27 |
| 2009/0158237 | A1 | 6/2009 | Zhang et al. |

(Continued)

OTHER PUBLICATIONS

Becker et al., Configurative Process Modeling—Outlining an Approach to increased Business Process Model Usability, Proceedings of the 15th IRMA International Conference, May 23-26, 2004, 12 pages.

(Continued)

*Primary Examiner* — Wei Zhen
*Assistant Examiner* — Mohammed Huda
(74) *Attorney, Agent, or Firm* — Schmeiser, Olsen & Watts; John Pivnichny

(57) ABSTRACT

A method and system for governing information is provided. The method includes receiving, by a processor, data defining a scope and context of an information governance project and information requirements data associated with the data. The processor classifies the information requirements data into concepts in accordance with a meta-model profile. The processor generates conceptual models and realization models in accordance with the meta-model profile. Governance roles are defined and assigned to informational assets within the conceptual models. The processor selects a final architecture option and generates policy models in accordance with the governance roles, the informational assets, the meta-model profile and user input. A final architecture option is deployed and monitored, and governance events triggered and reports generated in response to changes in this deployed architecture option.

20 Claims, 11 Drawing Sheets

(56) References Cited

U.S. PATENT DOCUMENTS

| | | | |
|---|---|---|---|
| 2009/0177510 A1* | 7/2009 | Marsh | G06Q 10/0631 705/7.12 |
| 2009/0254572 A1* | 10/2009 | Redlich | G06Q 10/06 |
| 2011/0167089 A1* | 7/2011 | Schoen | G06F 17/30286 707/802 |
| 2012/0174002 A1* | 7/2012 | Martin | G06F 8/38 715/763 |
| 2013/0232013 A1* | 9/2013 | Shepherd | G06Q 30/02 705/14.67 |
| 2013/0254162 A1 | 9/2013 | Watt | |

OTHER PUBLICATIONS

Maggie Bin Lai et al., Information Requirements of Process Stakeholders, a Framework to Evaluate Process Monitoring and Controlling Applications, Howe School of Technology Management, Stevens Institute of Technology, 2004, pp. 1-10.

Final Office Action (Mail Date Nov. 28, 2012) for U.S. Appl. No. 13/428,011; Filing Date Mar. 23, 2012; Confirmation No. 9800.

Amendment filed Dec. 26, 2012 in response to Office Action (Mail Date Nov. 28, 2012) for U.S. Appl. No. 13/428,011; Filing Date Mar. 23, 2012; Confirmation No. 9800.

Final Office Action (Mail Date Oct. 30, 2013) for U.S. Appl. No. 13/428,011; Filing Date Mar. 23, 2012; Confirmation No. 9800.

Amendment After Final filed Dec. 20, 2013 in response to Final Office Action (Mail Date Oct. 30, 2013) for U.S. Appl. No. 13/428,011; Confirmation No. 9800.

Request for Continuation Examination filed Jan. 8, 2014 for U.S. Appl. No. 13/428,011; Filing Date Mar. 23, 2012; Confirmation No. 9800.

Notice of Allowance (Mail Date Jun. 24, 2014) for U.S. Appl. No. 13/428,011; Filing Date Mar. 23, 2012; Confirmation No. 9800.

* cited by examiner

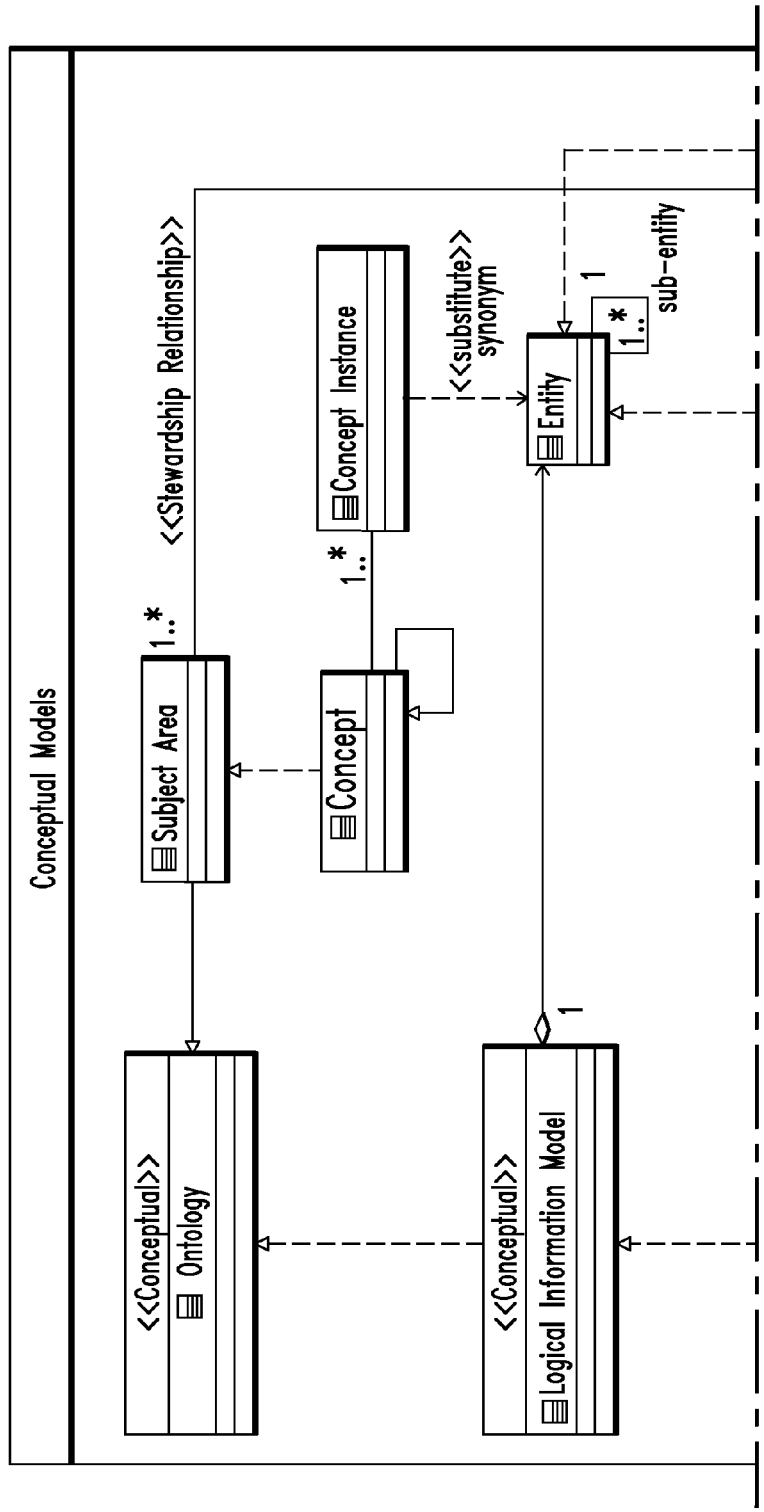

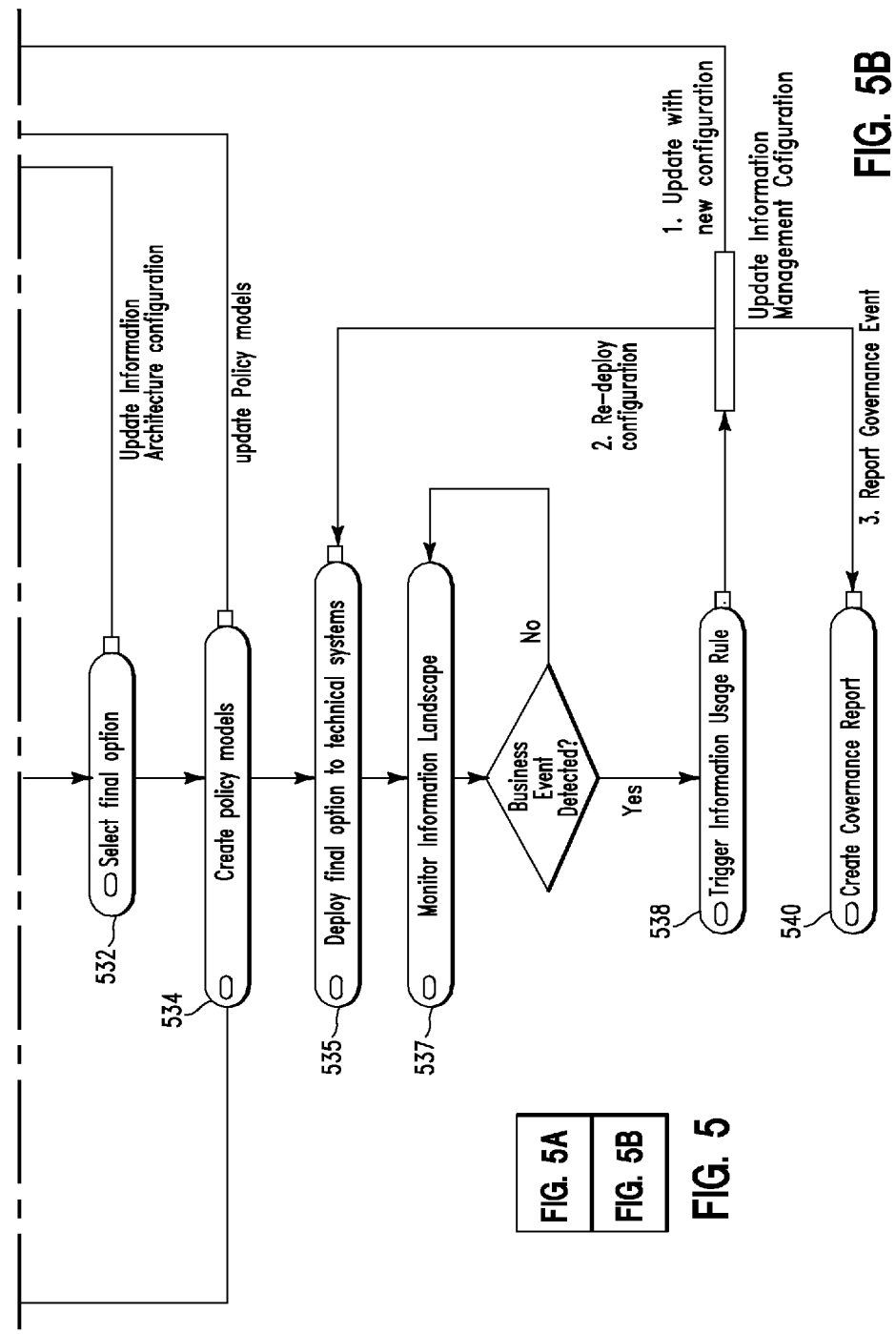

GOVERNING INFORMATION

GOVERNING INFORMATION

This application is a continuation application claiming priority to Ser. No. 13/428,011 filed Mar. 23, 2012.

FIELD

The present invention relates to a method and associated system for an independent mechanism for governing information.

BACKGROUND

Managing and governing information and data comprises an inaccurate process with little flexibility. Allowing multiple systems to manage data may include a complicated process that may be time consuming and require a large amount of resources. Accordingly, there exists a need in the art to overcome at least some of the deficiencies and limitations described herein above.

SUMMARY

The present invention provides receiving, by a computing system comprising a computer processor, first data defining a scope and context of an information governance project, the computing system storing a meta-model profile; receiving, by the computer processor, information requirements data associated with the first data, the information requirements data conforming to semantics and syntax specified in the meta-model profile; classifying, by the computer processor, the information requirements data into concepts in accordance with the meta-model profile; generating, by the computer processor, conceptual models from the concepts and in accordance with the meta-model profile; generating, by the computer processor, realization models from the concepts and in accordance with the meta-model profile; defining, by the computer processor, governance roles associated with the meta-model profile; assigning, by the computer processor, the governance roles to informational assets within the conceptual and realization models; selecting, by the computer processor in response to the user commands, a final architecture option; generating, by the computer processor, policy models in accordance with the governance roles, the informational assets, and the meta-model profile; modifying, by the computer processor in response to user commands, elements of the policy models resulting in modified policy models; and deploying, by the computer processor, the final architecture option associated with the modified policy models and the information assets.

The present invention provides computer program product, comprising a computer readable storage device storing a computer readable program code, the computer readable program code comprising an algorithm that when executed by a computer processor of a computer system implements a method, the method comprising: receiving, by the computer processor, first data defining a scope and context of an information governance project, the computing system storing a meta-model profile; receiving, by the computer processor, information requirements data associated with the first data, the information requirements data conforming to semantics and syntax specified in the meta-model profile; classifying, by the computer processor, the information requirements data into concepts in accordance with the meta-model profile; generating, by the computer processor, conceptual models from the concepts and in accordance with the meta-model profile; generating, by the computer processor, realization models from the concepts and in accordance with the meta-model profile; defining, by the computer processor, governance roles associated with the meta-model profile; assigning, by the computer processor, the governance roles to informational assets within the conceptual and realization models; selecting, by the computer processor in response to the user commands, a final architecture option; generating, by the computer processor, policy models in accordance with the governance roles, the informational assets, and the meta-model profile; modifying, by the computer processor in response to user commands, elements of the policy models resulting in modified policy models; and deploying, by the computer processor, the final architecture option associated with the modified policy models and the information assets.

The present invention provides a computer system comprising a computer processor coupled to a computer-readable memory unit, the memory unit comprising instructions that when executed by the computer processor implements a method comprising: receiving, by the computer processor, first data defining a scope and context of an information governance project, said computing system storing a meta-model profile; receiving, by said computer processor, information requirements data associated with the first data, the information requirements data conforming to semantics and syntax specified in the meta-model profile; classifying, by the computer processor, the information requirements data into concepts in accordance with the meta-model profile; generating, by the computer processor, conceptual models from the concepts and in accordance with the meta-model profile; generating, by the computer processor, realization models from the concepts and in accordance with the meta-model profile; defining, by the computer processor, governance roles associated with the meta-model profile; assigning, by the computer processor, the governance roles to informational assets within the conceptual and realization models; selecting, by the computer processor in response to the user commands, a final architecture option; generating, by the computer processor, policy models in accordance with the governance roles, the informational assets, and the meta-model profile; modifying, by the computer processor in response to user commands, elements of the policy models resulting in modified policy models; and deploying, by the computer processor, the final architecture option associated with the modified policy models and the information assets.

The present invention advantageously provides a simple method and associated system capable of managing and governing data and information.

BRIEF DESCRIPTION OF THE DRAWINGS

FIG. 2, including FIGS. 2A and 2B, illustrates an internal view of a conceptual and realization model of the meta-model of FIG. 1, in accordance with embodiments of the present invention.

FIG. 5, including FIGS. 5A and 5B, illustrates an algorithm detailing a process flow enabled by the system of FIG. 1, in accordance with embodiments of the present invention.

FIG. 6, including

DETAILED DESCRIPTION

Figure 1:
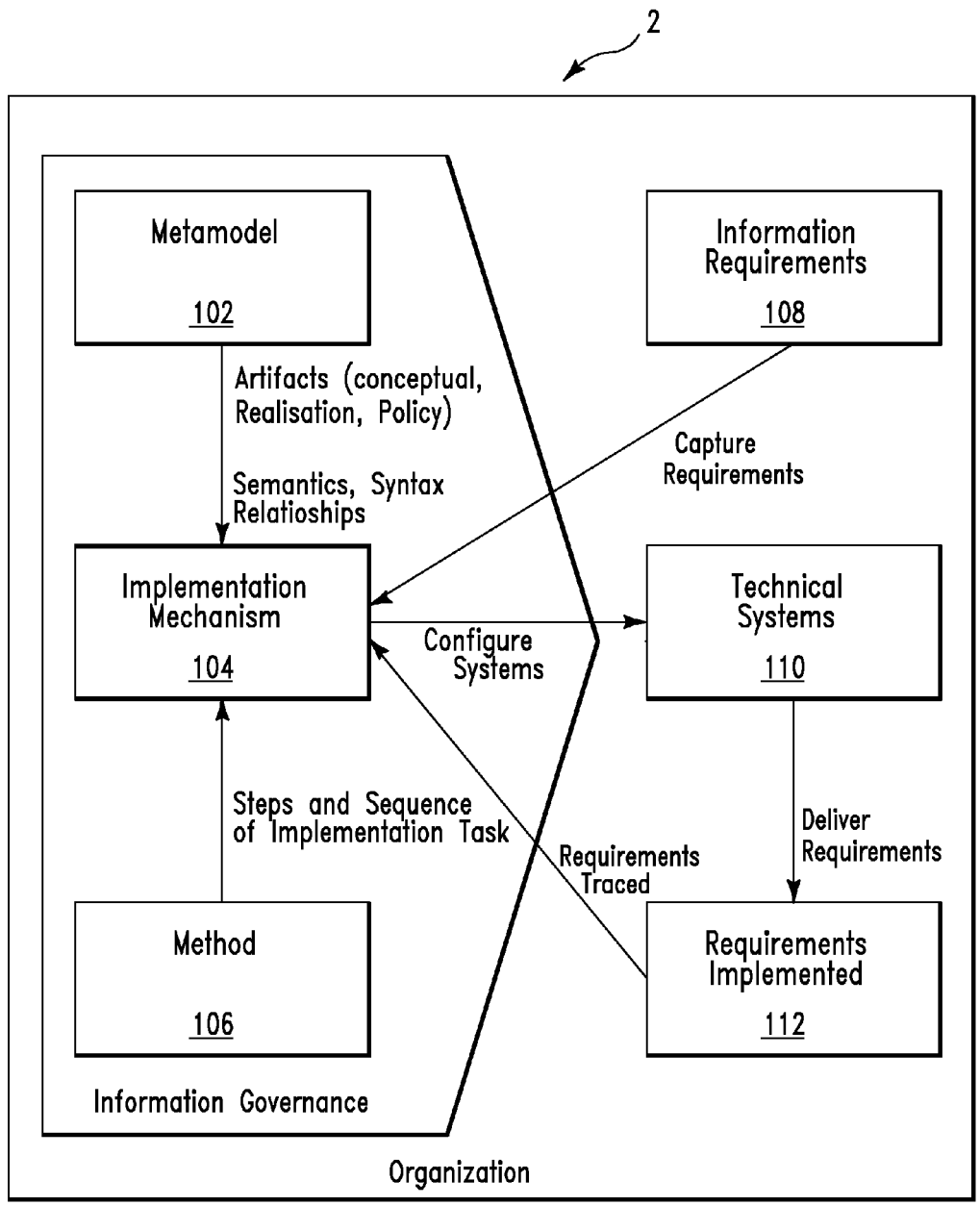
FIG. 1 illustrates a system to capture and manage information requirements, in accordance with embodiments of the present invention.

FIG. 1 illustrates a system 2 comprising a method 106, a meta-model 102, and an implementation mechanism 104 to capture and manage information requirements, in accordance with embodiments of the present invention. System 2 additionally comprises information requirements 108, technical systems 110, and requirements implemented 112 in communication with implementation mechanism 104. Meta-model 102 defines specifications for managing information requirements and associated implementation including, inter alia:
1. Defining ontology's and logical information models to capture requirements.
2. Defining realization models to deliver requirements using existing or planned technical software and hardware systems and their interfaces, messages and data storage structures.
3. Defining a stewardship model to govern conceptual and realization models.
4. Defining a policy model to configure how specific instances of conceptual, realization, and stewardship models are configured for specific customer needs.

Figure 2B:
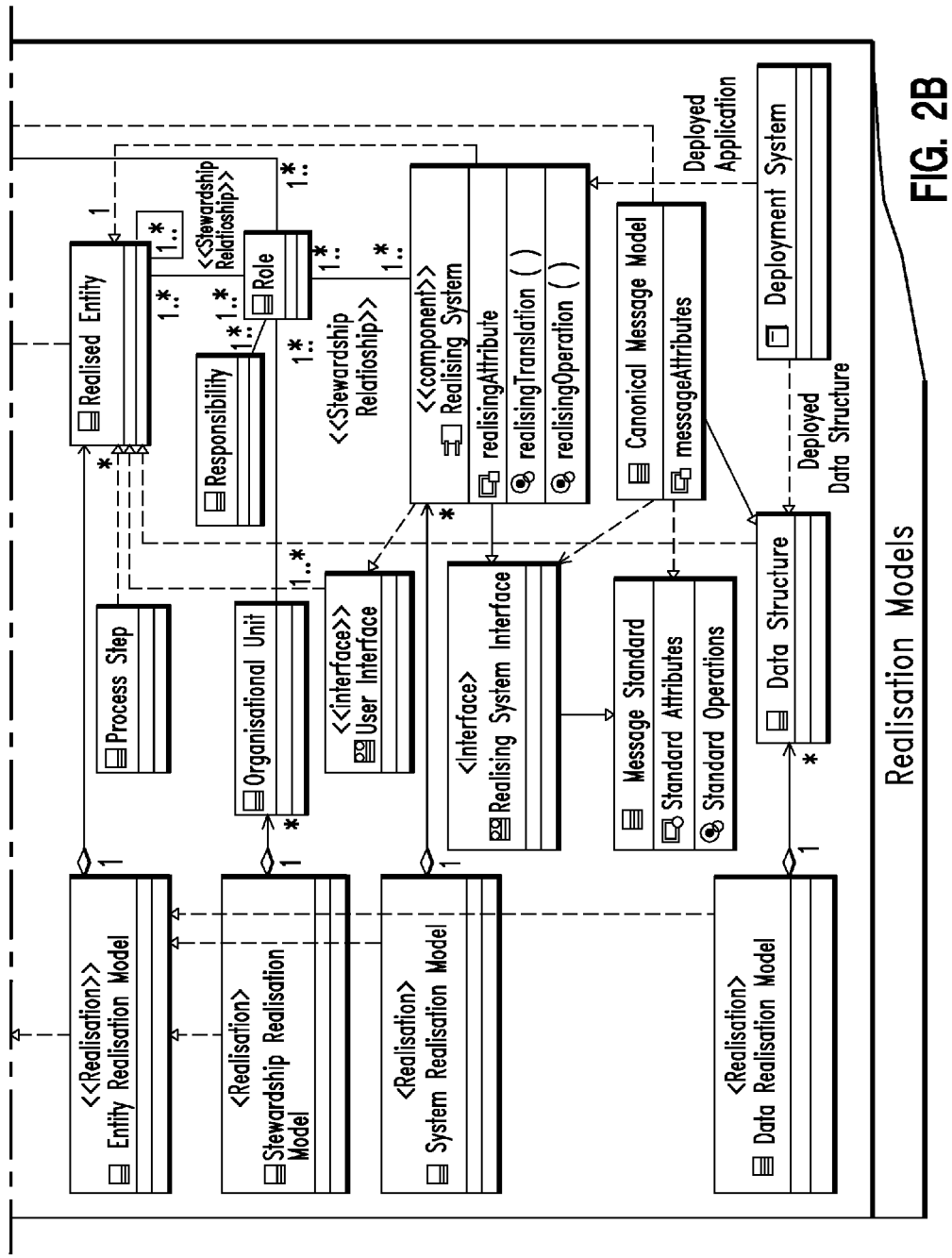

Meta-model 102 is used to define artifacts used to describe and implement information requirements, associated syntax (i.e., structure), and semantics (i.e., meaning). Meta-model 102 is structured into three sets of models (architectural views): Conceptual models, realization models, and policy models. Implementation mechanism 104 uses meta-model specifications to capture and manage information requirements, policies, and model alternatives for delivering the requirements. Method 106 defines a sequence of steps used by implementation mechanism 104 required to describe the requirements and their delivery. System 2 provides:
1. An ability to create models of information that represent a shared understanding of key information requirements held by different stakeholder groups.
2. The ability to manage the information requirements independently of underlying technology requirements, systems, and implementations.
3. A mechanism to systematically link different models of information (e.g., business requirements, logical models, implementation models, etc) so that an IT system landscape is understood in terms of the information it supports and may be directly traced back to business requirements.
4. The ability to manipulate the different models to determine optimal means to realize the information requirements.
5. The ability to understand the impact of change in information management requirements, implementation systems, or both.
6. The ability to plan and implement information governance capability.
7. The ability to integrate industry standard information models into overarching information governance defined through system 2.
8. Demonstrate compliance to data oriented regulations such as BASEL II; model and understand the impact of change in either information management requirements, implementation systems, or both; plan and implement information governance capability; reduce the cost to create and maintain information management solutions; reduce the cost to maintain an organization's information requirements FIG. 2, including FIGS. 2A and 2B, illustrates an internal view of a conceptual and realization model 200 of meta-model 102 of FIG. 1, in accordance with embodiments of the present invention. A conceptual models (of conceptual and realization model 200) defines a structure and meaning of information management requirements captured from stakeholders. A realization (of conceptual and realization model 200) defines a structure and meaning of how the captured requirements are implemented in physical application systems, user interfaces, processes, and data storage systems.

Figure 3:
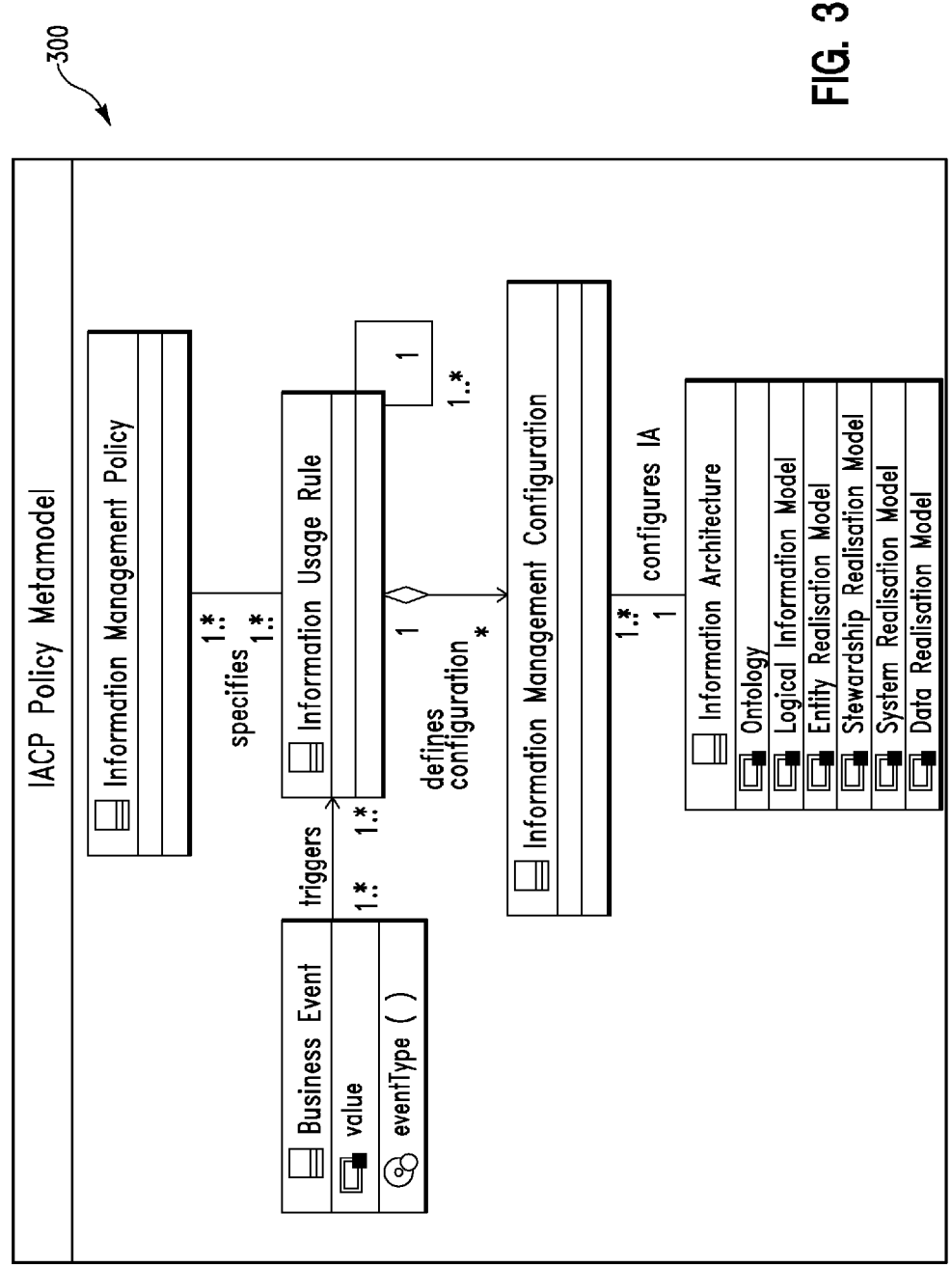
FIG. 3 illustrates an internal view of the policy model of the meta-model of FIG. 1, in accordance with embodiments of the present invention.

FIG. 3 illustrates an internal view of a policy model 300 of meta-model 102 of FIG. 1, in accordance with embodiments of the present invention. Policy model 300 describes how various artifacts from conceptual and realization model 200 are configured to deliver specific information management outcomes from these requirements and how information requirements, assets, and technical systems may be governed, and activity involving these reported on.

Figure 4:
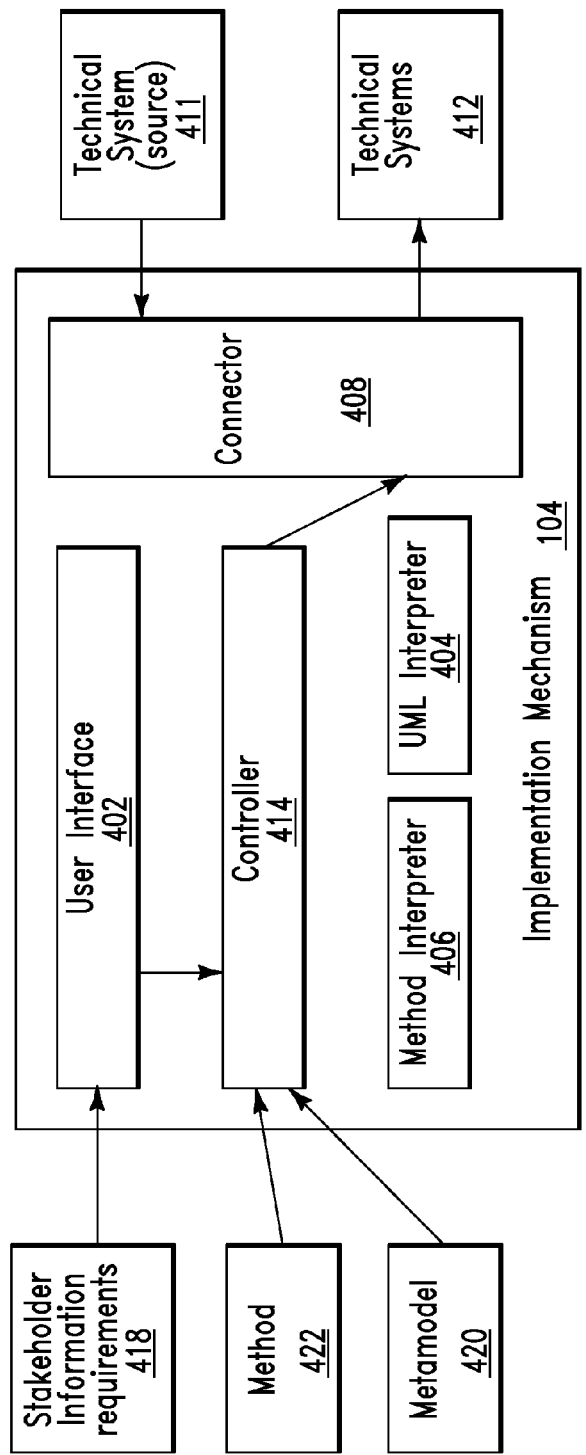
FIG. 4 illustrates an internal view of the implementation mechanism of the meta-model of FIG. 1, in accordance with embodiments of the present invention.

FIG. 4 illustrates an internal view of implementation mechanism 104 of meta-model 102 of FIG. 1, in accordance with embodiments of the present invention. Implementation mechanism 104 provides a technical system to capture and manage requirements, technical implementation decisions, and governance policies. Implementation mechanism 104 utilizes a software tool running on physical computing system hardware. The software tool incorporates the following components:
1. A user interface 402 to capture information requirements from stakeholders.
2. A UML interpreter 404 to instantiate or run a specification of meta-model 102.
3. A method interpreter 406 to instantiate phases, activities, and tasks defined in method 106 to ensure requirements are captured in a correct order following a format defined by meta-model 102.
4. A connector system 408 to connect to and operate common technical systems 412 used to manage information (e.g. databases).
5. A controller 414 to mediate interactions between the aforementioned components.

In order to enable implementation mechanism 104, an information stakeholder enters information requirements 418 into implementation mechanism 104. A Meta-model profile defining a syntax and semantics that information requirements 418 must satisfy (when they are captured) uses a set of conceptual models defined by a meta-model profile 420. The meta-model profile uses the set of conceptual models and steps specified by a method 422 to translate stakeholder requirements into specific information assets and policies (e.g., a customer asset that defines a syntax and semantics of a customer for an organization). The syntax and semantics of conceptual models ensure that information requirements captured from different information stakeholders are compatible with each other. Implementation mechanism 104 may additionally import existing information model formats or data model formats used in existing enterprise systems thereby ensuring that business and technical stakeholders may integrate across diverse models and map information management requirements unique to an organization onto publicly available information models and technical systems.

Implementation mechanism 104 uses two types of conceptual models (ontology model and logical information model)

defined in meta-model 420. The ontology model allows implementation mechanism 104 to capture requirements as groups of related concepts (i.e., using an ontology definition language such as the ontology web language (owl)) so that specific concepts may be related to more general concepts. For example, an information stakeholder may define Customer as being a concept with a name and customer number conforming to a defined syntax. Implementation mechanism 104 is used to select an existing eCustomer concept and extend the concept to include corporate customers (e.g., requiring a corporation name and address and company number), with the extension being related such that properties and conditions that must be met for a requirement to be considered a customer flow from higher to lower level concepts). Implementation mechanism 104 mechanism ensures that technical information solutions created to produce reports on customer information may assemble all required customer information from different information sources without producing incompatible meanings for different types of customers (for example, business customers, retail customers, private customers etc).

A logical information model provides a mechanism to integrate industry standard information models into implementation mechanism 104. The industry standard information models may be expressed in UML or IDEF formats. If an organization mandates the industry standard information models as standards, the logical information model may integrate these models through a link between a concept instance and an entity in meta-model 420. For example, a bank may use the IBM Banking Data Warehouse model and when a stakeholder creates the customer concept, it may be linked to the customer entity in this warehouse model using implementation mechanism 104. A logical information model may additionally be used to capture information requirements that do not conform to any language constraints of ontology languages such as OWL (based on first order logic) used in the ontology model.

Implementation mechanism 104 uses four different realization models specified in meta-model 420. The four realization models define how information requirements may be delivered through technical mechanisms. The realization models allow implementation mechanism 104 to trace from information requirements down to technical delivery of the realization models within information solutions. The realization models include:
1. An entity realization model defining what information is visible, for example in user interfaces or process steps.
2. A system realization model defining technical software and hardware systems used to manage information and their interfaces.
3. A stewardship realization model defining governance and security roles.
4. A data realization model defining data structures that store and transmit information and data.

Stakeholders may select concepts captured in the conceptual models and populate the entity realization model by marking these for visibility by the different available governance roles which have been previously entered into implementation mechanism 104. The system realization model is populated by information system configurations that may be pre-packaged for different information sources within an organization and associated implementation platforms (hardware nodes and locations within the organization).

Implementation mechanism 104 additionally uses an information management policy model specified in meta-model 420. The information management policy model defines structured rules that may be assembled into customizable configurations of other artifacts defined through meta-model 420. The rules are triggered by events that define when information assets (entities) change their state. Once an event is triggered, rule(s) are invoked that are linked to one or more information management configurations used to configure one or more of the artifacts defined by meta-model 420. The aforementioned process allows stakeholders to define specific conditions and rules to govern different aspects (i.e., requirements and technical implementations) of an organizations information management landscape. Information policies may additionally be used to configure implementation mechanism 104 to control how information requirements are captured (e.g., to implement company-specific naming types, or pre-populate an ontology for the organization with a skeleton appropriate that is subsequently filled out with requirements from information stakeholders).

After requirements have been captured via the conceptual, realization, and policy models, implementation mechanism 104 may model alternatives by allowing users to modify the models to understand impacts on requirements and implementations and deploy this configuration into implementation choices in one or more technical solutions. The deployments may utilize pre-packaged system realization models that capture semantics of commercial off the shelf software solutions for managing information thereby allowing implementation mechanism 104 to connect to the off the shelf software solutions and create required data and reporting structures. The off the shelf software solutions are populated and configured using the conceptual, realization, and policy models. If existing information and data may not be modified, translation data structures may be created within target technical solutions or within implementation mechanism 104.

System 2 enables full lifecycle traceability of information requirements across all models. As requirements are committed to deployment, implementation mechanism 104 comprises all required information to graphically illustrate how a requirement is realized across different models and technical systems 417 and 412. Additionally (as requirements change), different stakeholders may enable implementation mechanism 104 to model dependencies and impacts before committing them to deployment. Additionally, changes in governance policies for different information assets, requirements, and realization choices may be modeled and understood before committing to deployment.

Figure 5A:
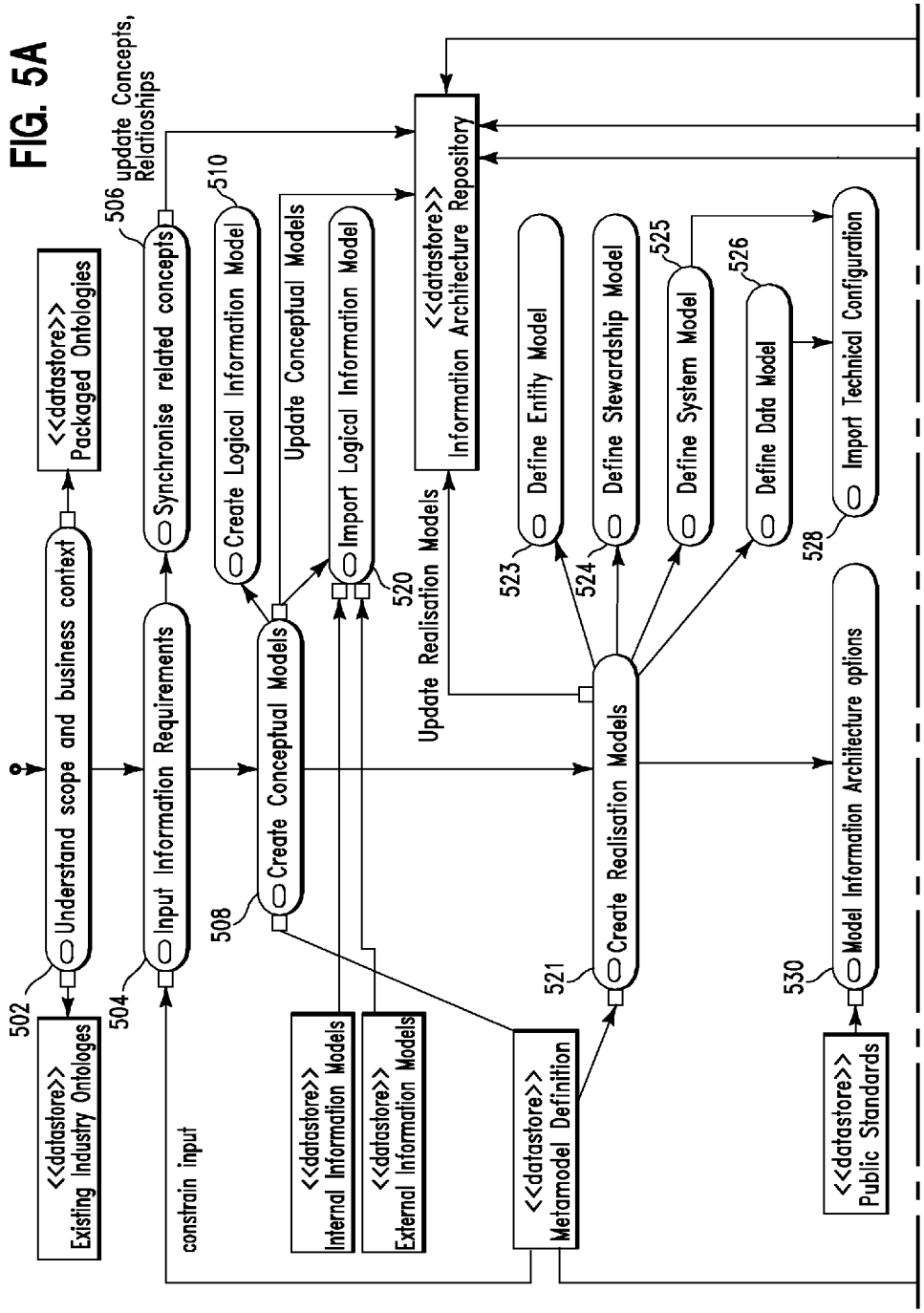

FIG. 5, including FIGS. 5A and 5B, illustrates an algorithm detailing a process flow enabled by system 2 of FIG. 1 for capturing and managing information requirements 2, in accordance with embodiments of the present invention. Each of the steps in the algorithm of FIG. 5 may be enabled and executed by a computer processor executing computer code. In step 502, a scope and context of an information governance project is defined by a user selecting and customizing industry definitions in an implementation mechanism. The definitions are provided through ontology's or structured relationships between concepts (or terms) and are designed to describe concepts from specific industries (e.g., government, chemicals, petroleum, telecommunications, etc). Therefore, the definitions reflect a type of industry a stakeholder may be working within. Ontology's packaged with the implementation mechanism or publicly available on the Web are provided. The implementation mechanism uses a meta-model profile to display (only) first through third levels of the ontology's. A user interface allows the stakeholder to customize the meta-model profile by adding or removing concepts and relationships. Upon completion, the implementation mechanism marks subject areas within the ontology model. In step 504, the stakeholders input information management requirements. The implementation mechanism displays high level subject areas that comprise a scope/context The stakeholders extend the high level subject areas by adding concepts and attributes (e.g., a product may be extended with retail product and wholesale product, etc) and relationships (e.g., a retail customer uses retail products, not wholesale products). The implementation mechanism constrains these new concepts to conform to syntax and semantics specified in the meta-model profile (i.e. it controls the allowable format and meaning of concepts and relationships). Step 504 continues until a user is satisfied that enough requirements have been entered. In step 506, the implementation mechanism profiles classified concepts and relationships to extract concepts with a high degree of similarity (e.g., two customer concepts differing by only one attribute). The concepts are rationalized and presented to the user for merging. In step 508, the stakeholders complete definition of information requirements and establish linkages to other required information models to ensure traceability by creating required conceptual models. Allowable types of conceptual model are defined by a meta-model definition and include ontology's and logical information models. A sequence for creating the conceptual models is defined by the method 106.

The implementation mechanism displays the subject areas, input concepts, and relationships in a single diagram. The diagram represents a canonical ontology of information requirements representing shared understanding of key information requirements held by different stakeholder groups. A stakeholder is additionally allowed to select one or more concepts for linking to subsequent models thereby providing a mechanism to systematically link different models of information (e.g., business requirements, logical models, implementation models, implementations, etc). The method 106 specifies that a next type of model comprises a logical information model. The logical information model allows stakeholders (e.g., technical specialists or information architects) to add additional details to the business information requirements inputted in previous steps. The stakeholder is additionally presented with an option to specify detailed information requirements through one or more logical information models. In step 510, the implementation mechanism presents a user interface option to visually construct logical information models using a visual diagramming language. The stakeholders construct and link the model to one or more concepts in the ontology. In step 520, the implementation mechanism presents a user interface option to import existing logical information models. The imported logical information models are also linked to one or more concepts in the ontology. The implementation mechanism supports a range of commonly used formats for these models and may be configured with additional components to support further standard formats. In step 521 the stakeholders create realization models that describe how the information requirements will be implemented in technical systems and how governance relationships are traced throughout the different information models. Allowable types of realization models are defined by a meta-model definition and include entity, stewardship, system, and data realization models. A meta-model definition additionally specifies allowed relationships between these models and how collected information requirements may be delivered through these models (e.g., how a requirement for customer reports will be assembled by technical systems using realized entities and data structures). A sequence for creating the models is defined by a method artifact that is consumed by the implementation mechanism.

A stakeholder is presented with an option to specify one or more of the realization models. The implementation mechanism uses the meta-model definitions to constrain semantics and syntax of the models. In step 523, the stakeholders create an entity realization model by defining concepts and/or entities from conceptual models that are visible to users (e.g., through a user interface to capture instances of customer data or as data used in a process modeling step), thereby allowing the concepts and/or entities to be modified by technical systems in the system realization model and stored and managed in storage systems in the data realization model (e.g., through a database management system). In step 524, the stakeholders create a stewardship realization model by creating roles and permissions for information assets stored in the implementation mechanism. The information assets are assigned within the conceptual and realization models. The stewardship realization model may be used to define roles and permissions in the system realization model and the ontology model (and hence inherited in the logical information model, entity realization model, and data realization model) thereby allowing the implementation mechanism to constrain changes to information collected in each model. The stewardship realization model additionally allows the implementation mechanism to define master data-type relationships for information managed by these systems. In step 525, the stakeholders create the system realization model by defining technical systems that will be will be used to manage information. The implementation mechanism provides a user interface that allows the stakeholders to associate realizing systems and their interfaces with message standards and canonical message models from the data realization model. The implementation mechanism allows the stakeholders to assign entities from the entity realization model to realizing systems for specified purposes such as, inter alia, exposing information to process models, allowing for user input to capture instance-data such as a specific customer's details, etc. The user interface allows the stakeholders to define which physical deployment system or hardware a particular system is deployed onto. Alternatively, the user interface supports a mode where a user may use an imported technical configuration that pre-populates the interface with existing definitions of realizing systems, interfaces, and deployment systems. In step 526, the stakeholders create the data realization model by defining data structures necessary to manage information defined in other models and collected through the implementation mechanism. The data realization model allows the implementation mechanism to trace from initial requirements to physical storage systems and illustrate a full lineage of how requirements are assembled from disparate sources of information. The implementation mechanism provides a user interface that allows the stakeholder to generate one or more data structures representing storage mechanisms for the information generated from the other conceptual and realization models. The meta-model definition specifies that the data structures may be generated automatically from realized entities from the entity realization model. The meta-model definition provides canonical message models to exchange information for the realizing systems in the system realization model. The canonical message models may be constructed automatically from logical information models. The data structure may be associated with realizing systems, interfaces, and deployment systems to represent a complete technical landscape necessary to manage information. In step 528, the implementation mechanism imports an existing technical configuration representing the system realization model and data realization model for an organization. The existing technical configuration allows the implementation mechanism to pre-populate the two aforementioned models with the actual systems and data deployed by an organization thereby allowing stakeholders to use this configuration to realize information requirements. In step 530, different combinations of a final information architecture are modeled to allow for determining an optimal manner in which to meet information requirements. The implementation mechanism provides a user interface with a current information landscape (architecture) configuration. The user interface allows the stakeholders to modify different elements of the landscape (i.e., different elements from the conceptual and realization models) and the implementation mechanism analyses to determine the impact this will have on other model elements. In step 532, a final architectural option is selected in order to deliver specified information requirements. In step 534, policy models are constructed to govern the final information architecture option selected in step 532, supra. The meta-model definition defines semantics and syntax of the policy models that specify how policies are constructed. The implementation mechanism uses this specification to provide a user interface to create and manage policies. The user interface allows the stakeholders to create a name for a policy and displays a list of business event types. Business event types are automatically generated by the Implementation Mechanism from the meta-model 102 and input requirements, and if required, the Implementation Mechanism can provide a user interface option to define additional event types. The stakeholders select a business event type and populate allowable values based on previously inputted information management requirements and realization decisions (i.e., values from the conceptual and realization models). The events are linked to an information usage rule that is triggered once the business event/value pair is detected. The Implementation Mechanism provides a user interface to construct these rules, using pre-populated common operations to act on information (e.g. update, delete, add, multiple etc). Each information usage rule may manage one or more information management configurations that are specific model/value pairs for each element defined in the meta-model. For example, a detected business event (e.g., a pricing change on a product) may trigger a review cycle through a role defined for the price subject area. The implementation mechanism may assess that the realizing system issuing the message comprises a role of master for product and therefore updates a data structure used to manage this master data with a new value. In step 535, a selected final option is deployed automatically to supporting technical systems. The deployment allows for information requirements to be made live in information management software and hardware systems. The implementation mechanism uses a connector subsystem and an information systems interface to establish a bi-directional flow between one or more technical systems required to support the information landscape and policy governance described in the implementation mechanism. In step 537, the implementation mechanism monitors changes in information and data residing in technical systems. Using technical mechanisms defined in a connector subsystem, the implementation mechanism uses an event processor to determine if the deployed information architecture has changed. If no events are detected a monitoring process continues. If an event is detected an information usage rule associated with that event is triggered. In step 538, business logic defined in the information usage rule is triggered in response to a detected business event. For example, the implementation mechanism may detect a change in the price of competitor products and invoke a pricing policy registered for that product. This policy defines a price match condition that updates a competing product price according to the business logic specified in information usage rule. The implementation mechanism then propagates this change to the technical system responsible for maintaining product pricing. Once an information usage rule has been triggered, three outcomes result in sequence. In the first outcome, the information architecture repository is updated with a new configuration determined by the business logic in the rule. In the second outcome, the implementation mechanism re-deploys the modified information architecture configuration. In the third outcome, a governance report is created. In step 540, the implementation mechanism creates reports detailing governance events and conditions for the deployed information architecture configuration. The reports may be triggered automatically in response to information usage rules, or may be manually triggered by stakeholders requesting a report on information governance status and activity.

Figure 6A:
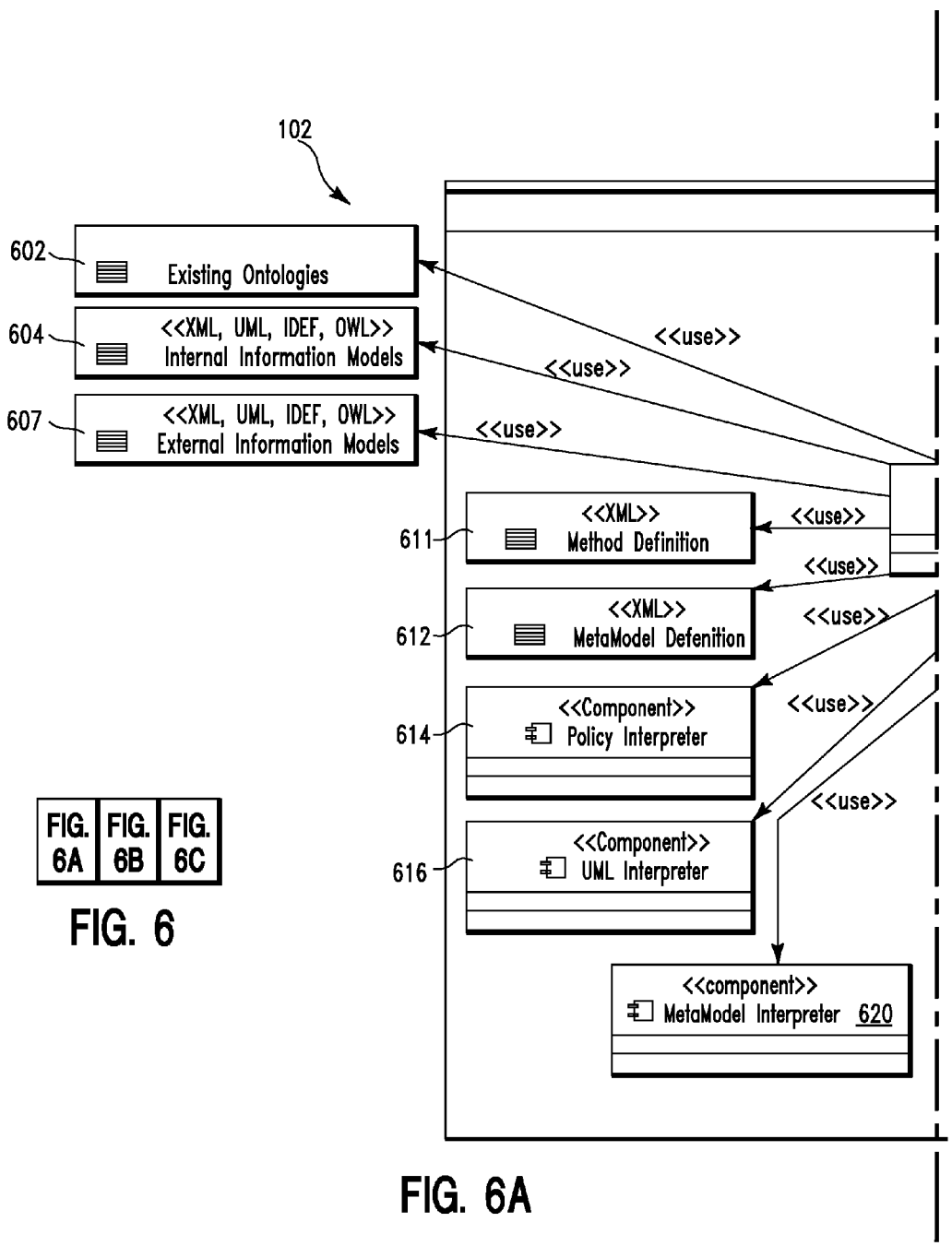
FIGS. 6A, 6B, and 6C, illustrates a detailed internal view of the implementation mechanism of FIG. 1, in accordance with embodiments of the present invention.
Figure 6B:
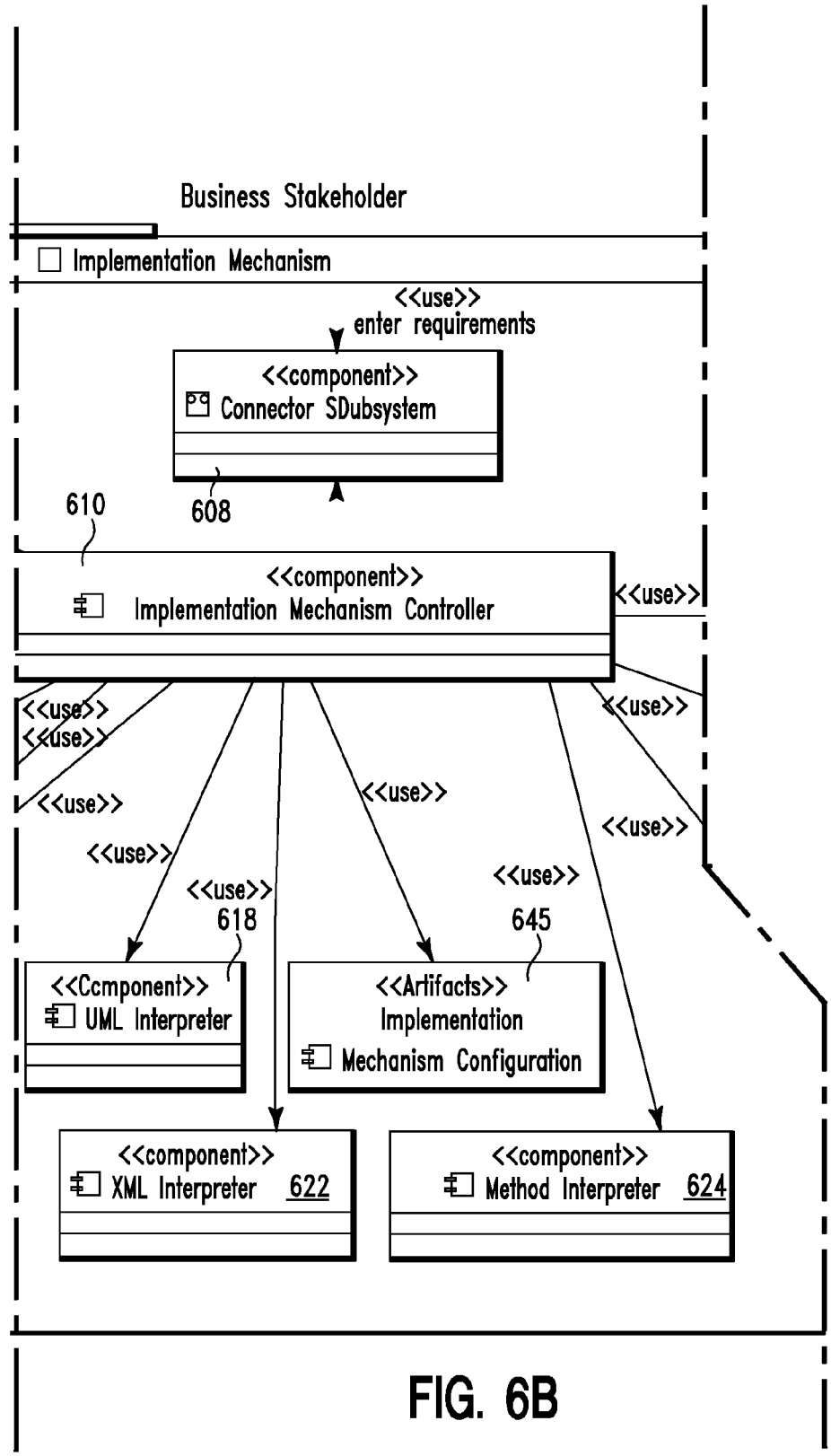
Figure 6C:
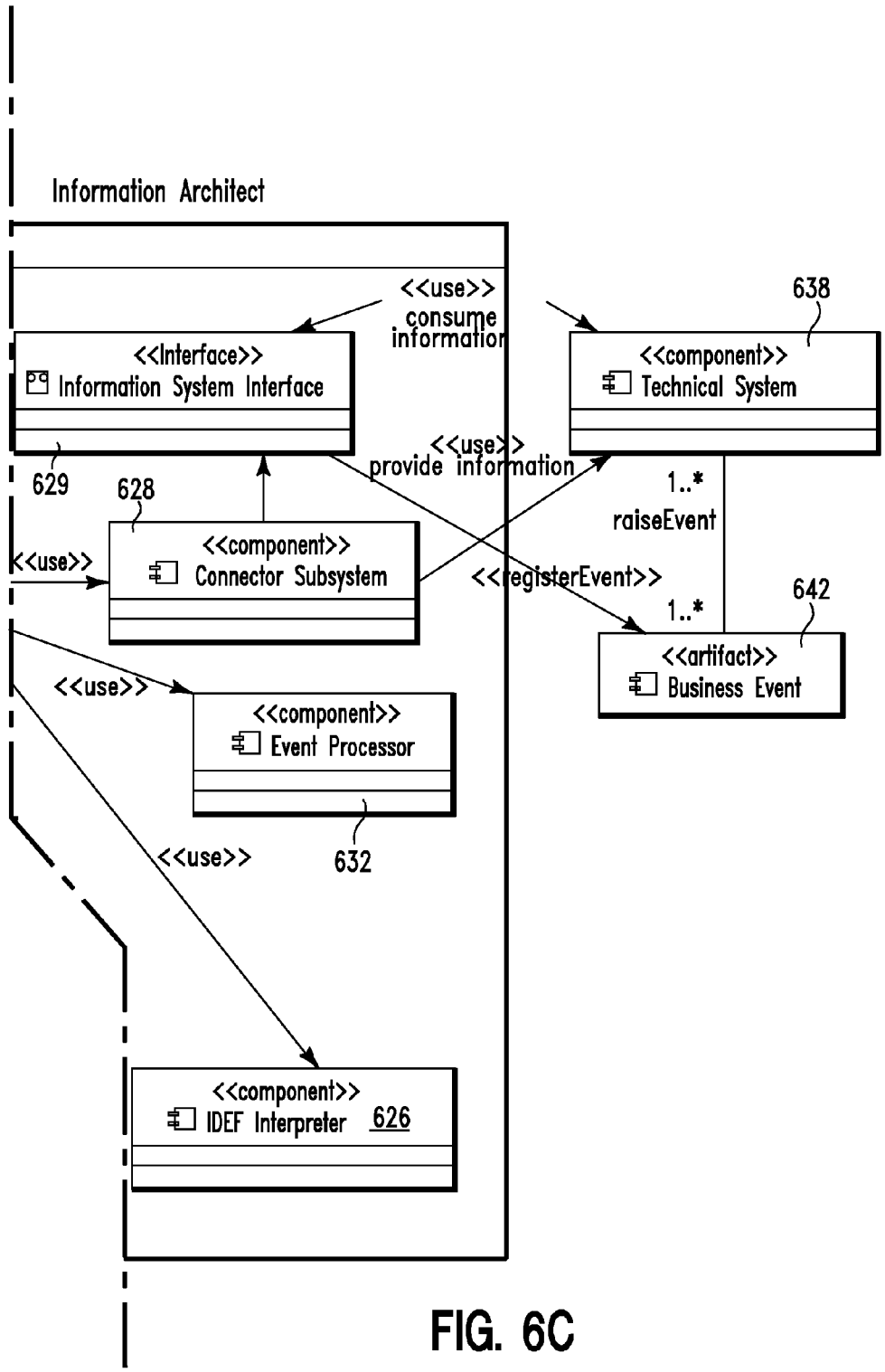

FIG. 6, including FIGS. 6A, 6B, and 6C, illustrates a detailed internal view of implementation mechanism 104 of meta-model 102 of FIG. 1, in accordance with embodiments of the present invention. The meta-model 102 comprises:

Existing ontology's 602 comprise a structured artifact (i.e., a file) authored in an ontology language (e.g. OWL) that describes concepts (or terms) and relationships between the concepts from specific industries (e.g., government, chemicals, petroleum, telecommunications, etc). The artifact reflects a type of industry that stakeholders may be working within. The ontology's are provided packaged with an implementation mechanism or publicly available on the Web. The artifact allows the implementation mechanism to pre-populate common terminology for specific industries thereby allowing business stakeholders to customize the artifact.

Internal information models 604 that include pre-existing information models constructed previously by an organization in order to describe detailed information management requirements for specific business areas (e.g., a security domain model may describe detailed organizational requirements for securing corporate information by specifying which concepts from an ontology must be protected with specific access rights and permissions). Internal information models 604 support existing internal data and information model formats so that practitioners may consume relevant parts of information metadata in existing technical systems. The implementation mechanism supports a range of commonly used formats for these models and may be configured with additional components to support further standard formats.

External information models 607 include pre-existing information models constructed previously by an outside party. External information models 607 describe detailed information management requirements for specific business areas. The implementation mechanism supports a range of commonly used formats for these models.

A user interface 608 provides all user interfaces for use by different stakeholders. The user interfaces are used to perform the following: enter requirements (high level and detailed), define how the requirements will be implemented through realization and policy models, link different models, explore model options, configure the implementation mechanism, and import internal and external information models.

An implementation mechanism controller 610 mediates flows of control and information between a user (via user interface 608) and all other components embodying business logic, and information formats.

A method definition artifact 611 describes a sequence of steps for creating different models defined in the meta-model. Method definition artifact 611 is created using an XML format and is used by the implementation mechanism to control which models are constructed in a specified sequence by implementation mechanism controller 610 and user interface 608.

A meta-model definition artifact 612 describes different types of models and their associated artifacts and inter-relationships that may be created in an implementation mechanism tool. Meta-model definition artifact 612 uses various model definitions to constrain how requirements, information assets, policies and implementation choices entered into a tool conform to the meta-model.

Policy interpreter component 614 is used to interpret information management policy defined in the implementation mechanism. Policy interpreter component 614 ensures that policies entered through user interface 608 conform to a syntax and semantics of the policy model-type defined in the meta-model and that these policies have registered business events, information usage rules, and corresponding information architecture configurations to manage.

A UML interpreter component 616 is used to create and/or validate UML models created or imported into the implementation mechanism.

An OWL interpreter component 618 is used to interpret and validate ontology models created via user interface 608. For example, a stakeholder constructs ontology models using user interface 608 which uses OWL interpreter component 618 to interpret them for compliance to an OWL 2.0 standard. OWL interpreter component 618 may be additionally used when checking entered requirements to ensure similar requirements are normalised to prevent divergence of similar information requirements.

Meta-model interpreter component 620 is used to interpret syntax and semantics of different models created and managed in the implementation mechanism, according to the specification contained in the meta-model definition 612. This allows the implementation mechanism to constrain a structure (syntax) and meaning (semantics) of requirements, information assets, policies and implementation choices entered into the implementation mechanism.

XML interpreter component 622 is used to interpret syntax of imported artifacts that have been written in XML (e.g., a method definition).

A method interpreter component 624 is used to interpret a meaning (semantics) of an imported method definition 611 and provides business logic (software algorithms and routines) to process user actions and construct models specified in method definition in a correct sequence.

An IDEF interpreter component 626 is used to create and/or validate IDEF models created or imported into the implementation mechanism. This occurs when creating or importing logical information models via user interface 608. For example, a stakeholder constructs or imports these models using user interface 608 which interprets them for compliance to IDEF standards and allows the stakeholder to link these models to other models as defined by the meta-model.

A connector subsystem component 628 is used to connect to technical systems (in use within an organization) to manage information (outside of the implementation mechanism). Connector subsystem component 628 allows the implementation mechanism to consume or provide information and data to and from systems through information subsystems interface 629 thereby allowing the implementation mechanism to:

1. Consume data by inputting data and information into the realization model and the data realization model.
2. Populate data by populating technical systems with information and data necessary to realize information requirements.
3. Monitor technical systems for business events that represent changes in information and data as specified by the defined information management policies.

Information subsystems interface 629 is used by connector subsystem 628 to connect to technical systems using industry-standard and proprietary communication interface definitions and technologies.

Event processor 632 is used by implementation mechanism controller 610 to process business events arising in technical systems which in turn trigger execution of information management policies. Each defined policy logs a business event register entry (stored in implementation mechanism configuration 645) with this component thereby defining which changes in data or information values should be detected by the implementation mechanism. Once logged, implementation mechanism controller 610 determines which technical systems store required data and information values, then monitors these systems for any change in said data and information. If the required data and information values change, implementation mechanism controller 610 calls policy interpreter component 614 to execute a registered policy corresponding to those values.

Technical system component 638 represents technical information management systems used to store and manage data and information (e.g., application servers, databases, content management systems, etc).

Business events 642 comprise events that result in a change in data/information within technical systems that are monitored by the implementation mechanism. Business events 642 are used to initiate information management policies as part of an overall governance of information stored within these systems, and are enabled by the event processor 632.

Implementation configuration component 645 stores all data and information managed and used by implementation mechanism controller 610.

Figure 7:
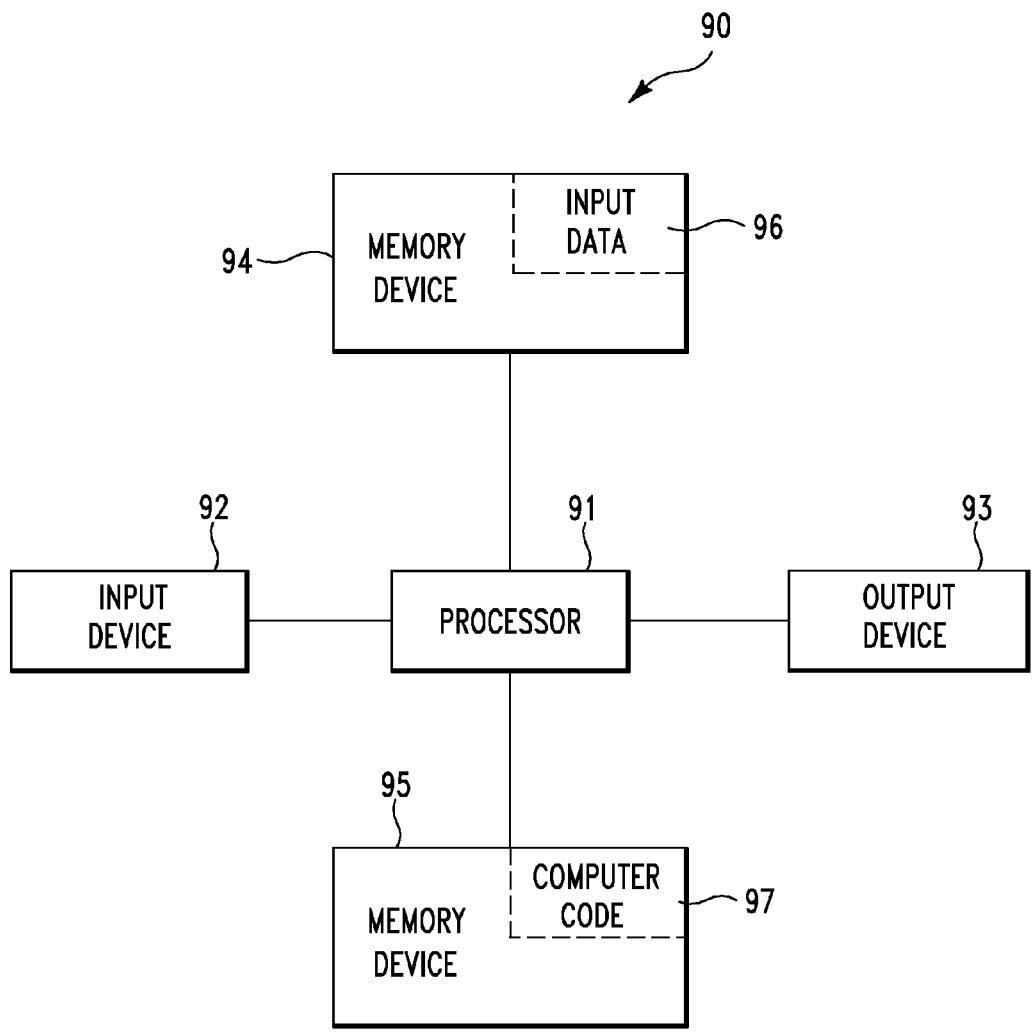
FIG. 7 illustrates a computer apparatus used by the system of FIG. 1 for capturing and managing information requirements, in accordance with embodiments of the present invention.

FIG. 7 illustrates a computer apparatus 90 used by system 2 of FIG. 1 for capturing and managing information requirements, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 5) for capturing and managing information requirements. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may comprise the algorithm of FIG. 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to capture and manage information requirements. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for capturing and managing information requirements. In another embodiment, the invention provides a business method that performs the process steps of the invention on a subscription, advertising, and/or fee basis. That is, a service supplier, such as a Solution Integrator, could offer to capture and manage information requirements. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving, by a computing system comprising a computer processor, first data defining a scope and context of an information governance project, said computing system storing a meta-model profile associated with a meta-model, wherein said meta-model comprises an implementation mechanism, and wherein said implementation mechanism comprises a software tool that includes:
a user interface configured to capture information requirements from stakeholders for customizing the meta-model profile by adding or removing concepts and relationships;
a UML interpreter configured to instantiate or run a specification of said meta-model;
a method interpreter configured to instantiate phases, activities, and tasks defined in a method to ensure that requirements are captured in a correct order following a format defined by said meta-model;
a connector system configured to connect to and operate common technical systems used to manage databases; and
a controller configured to mediate interactions between components;
displaying, by said computer processor, high level subject areas comprising a scope/context for extending said the high level subject areas by adding or removing said concepts and relationships;
importing, by said computer processor, existing logical information/data model formats used in existing enterprise systems;
linking, by said computer processor, said existing logical information/data model formats to at least one concept of said concepts;
integrating, by said computer processor, business and technical stakeholders across diverse models;
mapping, by said computer processor, information management requirements with respect to an organization onto publicly available information models and technical systems;
receiving, by said computer processor, information requirements data associated with said first data, said information requirements data conforming to semantics and syntax specified in said meta-model profile;
classifying, by said computer processor, said information requirements data into concepts in accordance with said meta-model profile;
generating, by said computer processor in accordance with a sequence for generating models, conceptual models from said concepts and in accordance with said meta-model profile, wherein said conceptual models define a structure and meaning of said first data, and wherein each concept model of said conceptual models comprises a subject area and a concept instance;
generating, by said computer processor in accordance with said sequence, realization models from said concepts and in accordance with said meta-model profile, wherein said realization models are configured to deliver requirements using existing or planned technical software and hardware systems and associated interfaces, messages, and data storage structures, and wherein each realization model of said realization models comprises a role, a realization user interface, a realizing system interface, a canonical message model comprising message attributes, and a deployment system;
associating, by said computer processor executing said realization user interface, realizing systems and associated interfaces with message standards and canonical message models of said data realization models;
defining, by said computer processor, a stewardship model configured to govern said conceptual models and said realization models;
assigning, by said computer processor, governance roles associated with said meta-model profile to informational assets within said conceptual models;
generating, by said computer processor in accordance with said sequence, policy models in accordance with said governance roles, said informational assets, and said meta-model profile, wherein said policy models are configured to determine how specific instances of said conceptual models, said realization models, and said stewardship models are configured for specific customer needs;
modifying, by said computer processor in response to user commands, elements of said policy models resulting in said modified policy models; and
deploying, by said computer processor, a final architecture option associated with said modified policy models and said information assets.

2. The method of claim 1, further comprising:
synchronizing, by said computer processor, associated and related concepts of said concepts, wherein said conceptual models are generated from said associated concepts.

3. The method of claim 1, wherein said defining said governance roles comprises:
defining governance operations associated with said governance roles.

4. The method of claim 1, further comprising:
generating, by said computer processor, a meta-model view configured to control a requirements capture process, a concept classification process, an information model creation process, and a realization model creation process.

5. The method of claim 1, further comprising:
monitoring, by said computer processor, said deployed final architecture option for business events described in said policy models.

6. The method of claim 5, further comprising:
generating, by said computer processor, a governance report detailing said business events, business rules triggered, changes in said deployed final architecture option, and additional data related to the information assets defined in the said deployed final architecture option.

7. The method of claim 1, further comprising:
triggering, by said computer processor, usage rules defined in the policy models that alter said final architecture option in accordance with the said usage rules; and
redeploying, by said computer processor, the final architecture option.

8. A process for supporting computing infrastructure, the process comprising providing at least one support service for at least one of creating, integrating, hosting, maintaining, and deploying computer-readable code in a computer comprising a processor, wherein the processor carries out instructions contained in the code causing the computer to perform the method of claim 1.

9. A computer program product, comprising a computer readable hardware storage device storing a computer readable program code, said computer readable program code comprising an algorithm that when executed by a computer processor of a computer system implements a method, said method comprising:
receiving, by said computer processor, first data defining a scope and context of an information governance project, said computing system storing a meta-model profile;
receiving, by said computer processor, information requirements data associated with said first data, said information requirements data conforming to semantics and syntax specified in said meta-model profile associated with a meta-model, wherein said meta-model comprises an implementation mechanism, and wherein said implementation mechanism comprises a software tool that includes:
a user interface configured to capture information requirements from stakeholders for customizing the meta-model profile by adding or removing concepts and relationships;
a UML interpreter configured to instantiate or run a specification of said meta-model;
a method interpreter configured to instantiate phases, activities, and tasks defined in a method to ensure that requirements are captured in a correct order following a format defined by said meta-model;
a connector system configured to connect to and operate common technical systems used to manage databases; and
a controller configured to mediate interactions between components;
displaying, by said computer processor, high level subject areas comprising a scope/context for extending said the high level subject areas by adding or removing said concepts and relationships;
importing, by said computer processor, existing logical information/data model formats used in existing enterprise systems;
linking, by said computer processor, said existing logical information/data model formats to at least one concept of said concepts;
integrating, by said computer processor, business and technical stakeholders across diverse models;
mapping, by said computer processor, information management requirements with respect to an organization onto publicly available information models and technical systems;
receiving, by said computer processor, information requirements data associated with said first data, said information requirements data conforming to semantics and syntax specified in said meta-model profile;
classifying, by said computer processor, said information requirements data into concepts in accordance with said meta-model profile;
generating, by said computer processor in accordance with a sequence for generating models, conceptual models from said concepts and in accordance with said meta-model profile, wherein said conceptual models define a structure and meaning of said first data, and wherein each concept model of said conceptual models comprises a subject area and a concept instance;
generating, by said computer processor in accordance with said sequence, realization models from said concepts and in accordance with said meta-model profile, wherein said realization models are configured to deliver requirements using existing or planned technical software and hardware systems and associated interfaces, messages, and data storage structures, and wherein each realization model of said realization models comprises a role, a realization user interface, a realizing system interface, a canonical message model comprising message attributes, and a deployment system;
associating, by said computer processor executing said realization user interface, realizing systems and associated interfaces with message standards and canonical message models of said data realization models;
defining, by said computer processor, a stewardship model configured to govern said conceptual models and said realization models;
assigning, by said computer processor, governance roles associated with said meta-model profile to informational assets within said conceptual models;
generating, by said computer processor in accordance with said sequence, policy models in accordance with said governance roles, said informational assets, and said meta-model profile, wherein said policy models are configured to determine how specific instances of said conceptual models, said realization models, and said stewardship models are configured for specific customer needs;
modifying, by said computer processor in response to user commands, elements of said policy models resulting in said modified policy models; and
deploying, by said computer processor, a final architecture option associated with said modified policy models and said information assets.

10. The computer program product of claim 9, wherein said method further comprises:
synchronizing, by said computer processor, associated and related concepts of said concepts, wherein said conceptual models are generated from said associated concepts.

11. The computer program product of claim 9, wherein said defining said governance roles comprises:
defining governance operations associated with said governance roles.

12. The computer program product of claim 9, wherein said method further comprises:
   generating, by said computer processor, a meta-model view configured to control a requirements capture process, a concept classification process, an information model creation process, and a realization model creation process.

13. The computer program product of claim 9, wherein said method further comprises:
   monitoring, by said computer processor, said deployed final architecture option for business events described in said policy models.

14. The computer program product of claim 13, wherein said method further comprises:
   generating, by said computer processor, a governance report detailing said business events, business rules triggered, changes in said deployed final architecture option, and additional data related to the information assets defined in the said deployed final architecture option.

15. The computer program product of claim 9, wherein said method further comprises:
   triggering, by said computer processor, usage rules defined in the policy models that alter said final architecture option in accordance with the said usage rules; and
   redeploying, by said computer processor, the final architecture option.

16. A computer system comprising a computer processor coupled to a computer-readable memory unit, said memory unit comprising instructions that when executed by the computer processor implements a method comprising:
   receiving, by said computer processor, first data defining a scope and context of an information governance project, said computing system storing a meta-model profile associated with a meta-model, wherein said meta-model comprises an implementation mechanism, and wherein said implementation mechanism comprises a software tool that includes:
      a user interface configured to capture information requirements from stakeholders for customizing the meta-model profile by adding or removing concepts and relationships;
      a UML interpreter configured to instantiate or run a specification of said meta-model;
      a method interpreter configured to instantiate phases, activities, and tasks defined in a method to ensure that requirements are captured in a correct order following a format defined by said meta-model;
      a connector system configured to connect to and operate common technical systems used to manage databases; and
      a controller configured to mediate interactions between components;
   displaying, by said computer processor, high level subject areas comprising a scope/context for extending said the high level subject areas by adding or removing said concepts and relationships;
   importing, by said computer processor, existing logical information/data model formats used in existing enterprise systems;
   linking, by said computer processor, said existing logical information/data model formats to at least one concept of said concepts;
   integrating, by said computer processor, business and technical stakeholders across diverse models;
   mapping, by said computer processor, information management requirements with respect to an organization onto publicly available information models and technical systems;
   receiving, by said computer processor, information requirements data associated with said first data, said information requirements data conforming to semantics and syntax specified in said meta-model profile;
   classifying, by said computer processor, said information requirements data into concepts in accordance with said meta-model profile;
   generating, by said computer processor in accordance with a sequence for generating models, conceptual models from said concepts and in accordance with said meta-model profile, wherein said conceptual models define a structure and meaning of said first data, and wherein each concept model of said conceptual models comprises a subject area and a concept instance;
   generating, by said computer processor in accordance with said sequence, realization models from said concepts and in accordance with said meta-model profile, wherein said realization models are configured to deliver requirements using existing or planned technical software and hardware systems and associated interfaces, messages, and data storage structures, and wherein each realization model of said realization models comprises a role, a realization user interface, a realizing system interface, a canonical message model comprising message attributes, and a deployment system;
   associating, by said computer processor executing said realization user interface, realizing systems and associated interfaces with message standards and canonical message models of said data realization models;
   defining, by said computer processor, a stewardship model configured to govern said conceptual models and said realization models;
   assigning, by said computer processor, governance roles associated with said meta-model profile to informational assets within said conceptual models;
   generating, by said computer processor in accordance with said sequence, policy models in accordance with said governance roles, said informational assets, and said meta-model profile, wherein said policy models are configured to determine how specific instances of said conceptual models, said realization models, and said stewardship models are configured for specific customer needs;
   modifying, by said computer processor in response to user commands, elements of said policy models resulting in said modified policy models; and
   deploying, by said computer processor, a final architecture option associated with said modified policy models and said information assets.

17. The computer system of claim 16, wherein said method further comprises:
   synchronizing, by said computer processor, associated and related concepts of said concepts, wherein said conceptual models are generated from said associated concepts.

18. The computer system of claim 16, wherein said defining said governance roles comprises:
   defining governance operations associated with said governance roles.

19. The computer system of claim 16, wherein said method further comprises:
   generating, by said computer processor, a meta-model view configured to control a requirements capture process, a concept classification process, an information model creation process, and a realization model creation process.

20. The computer system of claim 16, wherein said method further comprises:
monitoring, by said computer processor, said deployed final architecture option for business events described in said policy models.

* * * * *